United States Patent [19]

Turuda

[11] Patent Number: 4,742,406
[45] Date of Patent: May 3, 1988

[54] OPTICAL DETECTOR SYSTEM FOR DETECTING A SPLICE IN AN ENDLESS TAPE

[75] Inventor: Yuuichiro Turuda, Tokyo, Japan
[73] Assignee: Otari Electric Company, Ltd., Tokyo, Japan
[21] Appl. No.: 895,660
[22] Filed: Aug. 12, 1986
[30] Foreign Application Priority Data
  Apr. 11, 1986 [JP]  Japan .................................. 61-83864
[51] Int. Cl.$^4$ ........................................... G11B 15/08
[52] U.S. Cl. ...................... 360/93; 360/13; 360/74.6; 250/227; 242/55.19 A; 242/57; 226/45
[58] Field of Search ............ 360/74.6, 93, 137, 13, 360/130.3–130.33, 14.1; 242/55.19 A, 57, 209, 55.19 R; 226/45, 180, 190, 35, 176; 250/561, 227

[56] References Cited

U.S. PATENT DOCUMENTS

| | | | |
|---|---|---|---|
| 3,458,667 | 7/1969 | Burquez | 242/55.19 A |
| 3,519,833 | 7/1970 | Arch et al. | 250/561 |
| 3,614,453 | 10/1971 | Johnson | 250/561 |
| 3,615,155 | 10/1971 | Gelbman | 360/74.6 |
| 3,925,817 | 12/1975 | Althuber et al. | 360/74.6 |
| 4,219,167 | 8/1980 | Jenkins | 242/55.19 A |
| 4,221,316 | 9/1980 | Jenkins et al. | 242/57 |
| 4,380,032 | 4/1983 | Pfost | 360/74.6 |
| 4,583,669 | 4/1986 | Sirkis | 226/45 |

FOREIGN PATENT DOCUMENTS

| | | | |
|---|---|---|---|
| 794214 | 9/1968 | Canada | 242/55.19 A |
| 58-143456 | 8/1983 | Japan | 360/74.6 |

Primary Examiner—Raymond F. Cardillo
Assistant Examiner—Steven R. Garland
Attorney, Agent, or Firm—Schwartz & Weinrieb

[57] ABSTRACT

An endless tape recording and playback apparatus is provided with a splicing tape detection system which is capable of reliably detecting the presence of splicing tape secured to the endless recording tape. The system includes a capstan which is rotatable at a predetermined angular velocity, and a pinch roller which is capable of pivoting between capstan-engaged and capstan-disengaged positions. An optical detection system including a light emitter and a light detector implemented within a single body, and a support base mounted upon the pinch roller for directing the optical axis of the detection system toward the endless tape surface at an acute angle with respect to the tape surface, can detect the presence of the splicing tape. Due to the angular disposition of the detection system, the presence of the splicing tape can even be detected in conjunction with worn endless recording tape. The light emitter and light detector are mounted upon the pinch roller.

8 Claims, 2 Drawing Sheets

OPTICAL DETECTOR SYSTEM FOR DETECTING A SPLICE IN AN ENDLESS TAPE

FIELD OF THE INVENTION

The present invention relates generally to an endless tape recording and playback apparatus for recording signals onto, and playing back signals from, an endless tape contained within a tape cartridge case, and more particularly, to a system integrated into the endless tape recording and playback apparatus which can detect the presence of splicing tape used to join together the free ends of the recording tape when fabricating the same into an endless recording tape for disposition within the tape cartridge case.

BACKGROUND OF THE INVENTION

A large number of endless magnetic tape cartridges and endless tape recording and playback apparatus have been employed in radio broadcasting stations in order to broadcast the radio programs thereof. It is required that these endless tape recording and playback apparatus provide high quality performance with a low percentage of drop-out occurrences due to the particular industrial use required.

It is inherent in the fabrication of endless tapes for use in endless tape cartridges that the ends of the tape be spliced together at at least one point or location by means of splicing tape so that the tape will, in effect, be infinite or endless in length. However, the endless tape tends to cause a drop-out to occur at the location at which the splicing tape is secured to the tape ends in forming the endless tape when the spliced connection of the endless tape passes over the recording or playback head. This problem can be overcome by insuring that the splicing tape is always made to pass over the recording or playback head immediately before the signals are recorded upon the endless tape. This mode of operation, however, of course requires that the detection of the presence of the splicing tape secured upon the endless tape be in fact achieved.

It has previously been proposed to provide a means for optically detecting other tape secured upon a magnetic tape. For example, in such art, the other tape can be detected by means which can sense a change in the intensity of light reflected from the other tape. While this art is therefore advantageous in its detection reliability, it has not been found possible to employ such an optical detection arrangement in conjunction with endless tape recording and playback apparatus and the associated endless tape cartridge case due to a lack of sufficient space for accommodating such a detection arrangement.

It is further known in the detection art, and as disclosed, for example, within U.S. Pat. No. 4,221,316 issued to Jenkins et al., that an alternative detection system or arrangement exists wherein slight movements of the pinch roller, having a permanent magnet associated therewith and disposed near an electrical coil, due to the increased thickness of the endless tape at the splicing junction and as the endless tape and the splicing junction are moved between the pinch roller and the capstan, can be detected as a result of a current being generated within the coil. This type of system is therefore certainly appropriate for detection of the presence of the splicing tape upon the endless tape disposed within the endless tape cartridge case, however, it has also proven somewhat disadvantageous in that the detection performance is sometimes adversely affected by means of small vibrations of the pinch roller during normal tape transport operations.

OBJECTS OF THE INVENTION

In view of the prior art described above, including the disadvantages and deficiencies of prior art splicing tape detection systems, it is an object of the present invention to provide an endless tape recording and playback apparatus which has a splicing tape detection arrangement which is capable of reliably detecting the presence of splicing tape secured upon the endless recording tape.

It is another object of the present invention to provide an endless tape recording and playback apparatus that is capable of reliably detecting, by optical means, the presence of joints or connections defined between splicing tape and the opposite ends of the endless recording tape to be joined together by means of the splicing tape.

SUMMARY OF THE INVENTION

While the present invention will be readily understood from the detailed description to follow, a brief summary will now be set forth. The invention contemplates an endless tape recording and playback apparatus having a splicing tape detection arrangement which is capable of reliably detecting the presence of splicing tape secured upon the endless recording tape. In particular, the apparatus comprises a capstan revolving at a predetermined angular speed or number of revolutions, and a pinch roller which is capable of being pivotably mounted within the apparatus relative to the capstan. The improvement comprises an optical detection system which includes a light emitter and a light detector implemented within a single body, and a support base defining an optical axis for the optical detection means which is directed toward the endless recording tape at an acute angle with respect to the tape, and wherein the pinch roller has the optical detection means securely mounted thereon.

An advantage of the present invention is that drop-outs which normally or conventionally occur due to the presence of the splicing tape upon the endless recording tape cannot in fact result or occur due to the fact that as a result of the improved splicing tape detection sensitivity characteristic of the present invention, electrical signals and programs can only be recorded upon or played back from those portions of the endless recording tape upon which the splicing tape is not disposed upon the endless recording tape. Considered alternatively, the optical detection system of the present invention prevents the recording of signals upon or the playback of signals or programs from those portions of the endless recording tape upon which the splicing tape is disposed until the splicing tape junction has passed over the recording or playback head.

Another advantage of the present invention is that the optical detection system of the present invention can reliably detect the presence of the splicing tape upon the endless recording tape even when the endless recording tape is worn due to the fact that the tip of the optical detection means is directed at an acute angle or in other words at an angle which is less than a right angle with respect to the surface of the endless recording tape.

BRIEF DESCRIPTION OF THE DRAWINGS

Various other objects, features, and attendant advantages of the present invention will become more apparent from the following detailed description, when considered in connection with the accompanying drawings, in which like reference characters designate like or corresponding parts throughout the several views, and wherein.

DETAILED DESCRIPTION OF THE PREFERRED EMBODIMENT

Figure 4:
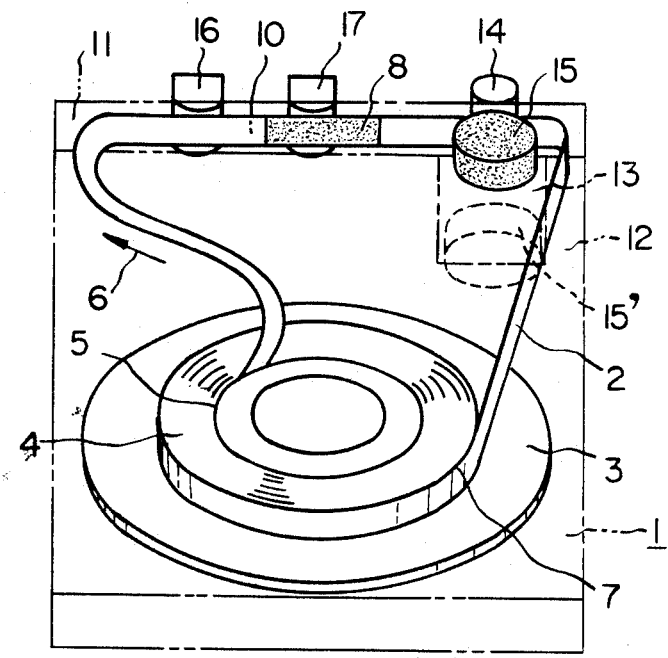
FIG. 4 is a perspecitve view of a basic endless tape recording and playback transport system.

Referring now to the drawings, FIG. 4 illustrates an endless tape cartridge for use with the endless tape recording and playback apparatus constructed in accordance with the present invention. The endless tape cartridge 1 has an endless tape 2 disposed therein and wound upon a revolving table or disk 3, the endless tape 2 forming a wound tape coil 4. The endless tape 2 is drawn out from an inside layer 5 of the tape coil 4 in the direction indicated by the arrow 6, and is rewound upon an outside layer 7 of the tape coil 4. In order to form the tape so as to have the configuration of an endless loop, both ends of the endless tape 2 are connected together by means of a splicing tape 8. The splicing tape 8 is secured to the rear surface of a magnetic type surface 10 of the endless tape 2 upon which signals and programs are recorded. The endless tape 2 is contained within a cartridge case 1 together with the revolving table 3, and an end or side face 11 of the cartridge case 1 is provided with a plurality of openings through which the magnetic surface 10 of the tape can be exposed. The cartridge case 1 also has another opening 13 defined within the bottom surface 12 thereof.

The endless tape recording and playback apparatus of the present invention, and adapted to be used with the endless tape cartridge 1, has a rotary capstan 14 which is operated at a specific angular speed or velocity, and in addition, also has a pinch roller 15 provided for pressing the endless tape 2 into contact with the capstan 14 so as to transport the endless tape at a specific rate of speed.

When the endless tape cartridge 1 is mounted onto or removed from the endless tape recording and playback apparatus, the pinch roller 15 is pivoted downwardly to its position 15'. The pinch roller 15 is inserted into or moved out from the cartridge case 1 through means of the opening 13 defined within the cartridge case 1. A description of the drive source for revolving the capstan 14, the arrangement for moving the pinch roller 15 downwardly, or the arrangement for operating the heads 16 and 17, have been omitted herefrom as these systems are conventional and well known.

Figure 1:
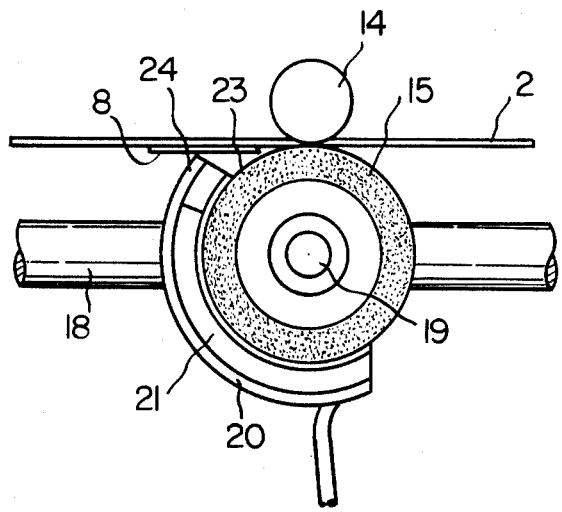
FIG. 1 is a plan view of an endless tape recording and playback apparatus including the optical detection system constructed in accordance with the present invention.
Figure 2:
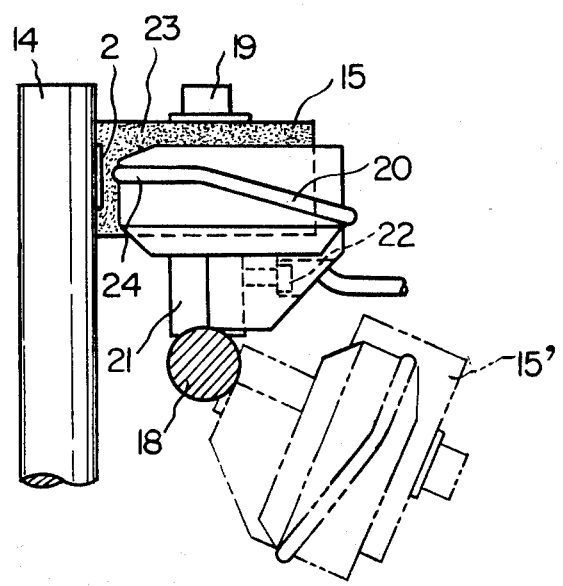
FIG. 2 is a side elevational view of the apparatus of FIG. 1.

FIGS. 1 and 2 show the essential parts of the endless tape recording and playback apparatus of the present invention. In the figures, the endless tape 2 is transported as a result of being pinched between the capstan 14 and the pinch roller 15. The pinch roller 15 is rotatably supported upon a pinch roller shaft 19 which is disposed at right angles with respect to a pivotable shaft 18 about which roller 15 is moved between its capstan engaged position 15 and its disengaged position 15'. The figures also shown an optical detection means 20 mounted upon a support base 21. The support base 21 is, in turn, mounted upon the pinch roller shaft 19 by means of a set screw 22, and is curved or arcuate in its configuration so as to be disposed along the exterior peripheral surface 23 of the pinch roller 15 so as to guide the optical detection means 20 around the exterior peripheral surface 23 of the pinch roller 15. A tip portion 24 of the optical detection means 20 is disposed within five millimeters (5 mm) of the surface of the endless tape 2 as determined by means of the support base 21.

The tip 24 of the optical detection means 20 is directed at an angle with respect to the longitudinal direction or extent of the endless tape 2, wherein the angle is an acute angle or, in other words, less than a right angle or less than 90° with respect to the surface of the endless tape 2. This means that the optical axis of the optical detection means 20 is directed at an angle which is less than a right angle with respect to tape 2, or in other words, the detection means 20 is disposed at an angle wherein the detection means is not disposed perpendicular to the surface of the endless tape 2. The optical detection means 20 can of course be pivoted downwardly together with the pinch roller 15 as the latter is moved toward its position 15'.

Figure 3:
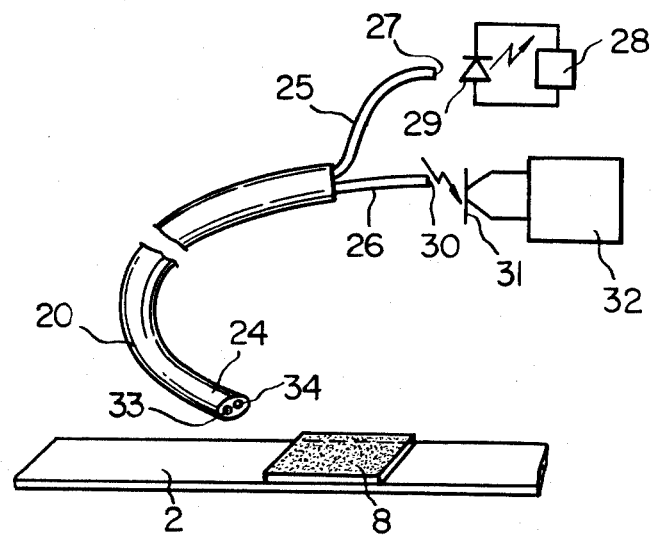
FIG. 3 is an illustration, partly pictorial and partly schematic, of a splicing tape detection system constructed in accordance with the present invention.

FIG. 3 illustrates in greater detail the optical detection system 20 of the present invention, the construction of which is as follows. The optical detection means 20 comprises a first optical fiber 25 and a second optical fiber 26. An end 27 of the first optical fiber 25 is disposed opposite a light emitter 29 that can be energized by means of a power supply 28. Similarly, an end 30 of the second optical fiber 26 is disposed opposite an optical sensor 31 which is connected to a light detection circuit 32 which can detect a change in the light intensity. These components, including the optical detection means 20, the light emitter 29, the power supply 28, the optical sensor 31, and the light detection circuit 32, are implemented within a single optical detection arrangement body.

The operation of the optical detection means 20 is as follows. A distal tip 33 of the first optical fiber 25 and a distal tip 34 of the second optical fiber 26 are disposed within the vicinity of the endless tape 2 and/or the splicing tape 8. It should be noted that the reflectance of the endless tape 2 is different from, or less than, that of the splicing tape 8. A change in the light intensity, therefore, can be detected by means of the optical sensor 31 when the splicing tape 8 passes under the tip 24 of the optical detection means 20.

The tip 24 of the optical detection means 20 allows detection of the splicing tape 8 with a high degree of sensitivity even in connection with worn endless tape 2 due to the fact that the optical axis of the detection means 20 is disposed at an angle which is less than that of a right angle or 90° with respect to the surface of the endless tape 2. The endless tape 2, in general, can absorb light as the same is normally black-coated; on the other hand, the splicing tape 8 can reflect the light in view of the fact that the same is normally glossy. For new endless tape, therefore, the tip 24 can be disposed at right angles with respect thereto. Old endless tape 2, however, becomes glossy due to the action of lubrication powders applied thereto as it is used a large number of times. If the tip 24 is disposed at a right angle with respect to the surface of the tape 2, the difference in the light reflected from the endless tape 2 and the splicing tape 8 becomes less because the splicing tape 8 is also glossy. This therefore results in difficulty in detecting the presence of the splicing tape 8. If the tip 24 is slanted or disposed at an angle less than that of a right angle or 90° with respect to the surface of the tape 2 or 8, on the contrary, the gloss of the endless tape 2 is substantially reduced or virtually eliminated whereby the difference in the light reflected becomes more pronounced or apparent.

Furthermore, in general, the splicing tape 8 is usually milk-white while the endless tape 2 is black or dark brown. Detection of the splicing tape 8 therefore can be made with a high degree of sensitivity as a result of the greater contrast in lightness between the recording and splicing tapes so that the light reflected from the splicing tape 8 can be more intense than that of the endless tape 2 irrespective of the frequent use of the endless tape 2.

Obviously, many modifications and variations of the present invention are possible in light of the above teachings. It is therefore to be understood that within the scope of the appended claims, the present invention can be practiced otherwise than as specifically described herein.

What is claimed is:

1. In combination with an endless tape recording and playback apparatus for recording or playing back signals on an endless tape contained within a cartidge case, and including a capstan rotating at a predetermined angular velocity and pinch roller disposed in contact with said capstan for transporting said endless tape therebetween, an optical detection system for detecting the presence of splicing tape secured upon said endless tape for securing opposite ends if said endless tape together, comprising:

a light emitter for emitting light toward said endless tape having said splicing tape secured thereon;

a light detector for receiving light reflected from said endless tape having said splicing tape secured thereon; and means for conducting said light from said light emitter toward said endless tape having said splicing tape secured thereon and for conducting said reflected light from said endless tape having said splicing tape secured thereon back to said light detector, said light conducting means being mounted upon said pinch roller.

2. A detection system as set forth in claim 1, wherein:
said pinch roller is pivotably mounted with respect to said capstan between a first operative position at which said pinch roller rotatably cooperates with said capstan for transporting said endless tape, and a second inoperative position at which said pinch roller is disengaged from said capstan.

3. A detection system as set forth in claim 2, wherein:
said light conducting means has an arcuate configuration.

4. A detection system as set forth in claim 3, wherein:
said light conducting means is disposed upon the outer periphery of said pinch roller.

5. A detection system as set forth in claim 2, wherein:
said light conducting means is disposed within the vicinity of said endless tape such that a distal end portion of said light conducting means is disposed in a contactless mode with respect to the surface of said endless tape.

6. A detection system as set forth in claim 5, wherein:
said distal end portion of said light conducting means defines an optical path which is disposed at an acute angle with respect to the surface of said tape.

7. A detection system as set forth in claim 2, wherein:
said light conducting means comprises optical fibers.

8. A detection system as set forth in claim 7, wherein:
said optical fibers for conducting said light to said endless tape from said light emitter and from said endless tape to said light detector are disposed within a single optical fiber cable.

* * * * *